United States Patent [19]

Parker et al.

[11] 4,377,623

[45] Mar. 22, 1983

[54] ELECTRO-CHEMICAL CELLS

[75] Inventors: Alan J. Parker, South Perth; Pritam Singh, Murdoch; James Avraamides, Bull Creek, all of Australia

[73] Assignee: Anumin Pty. Ltd., Murdoch, Australia

[21] Appl. No.: 283,603

[22] Filed: Jul. 15, 1981

[30] Foreign Application Priority Data

Jul. 29, 1980 [AU] Australia ............................. PE4745
Aug. 6, 1980 [AU] Australia ............................. PE900
Mar. 11, 1981 [AU] Australia ............................. PE949

[51] Int. Cl.$^3$ ........................................ H01M 12/04
[52] U.S. Cl. ..................................... 429/15; 429/105
[58] Field of Search ......................... 429/101, 105, 15

[56] References Cited

U.S. PATENT DOCUMENTS

| | | | |
|---|---|---|---|
| 3,879,221 | 4/1975 | Farrington | 429/105 |
| 3,887,400 | 6/1975 | Doniat et al. | 429/15 |
| 4,038,459 | 7/1977 | Ajami et al. | 429/101 |
| 4,105,829 | 8/1978 | Venero | 429/101 |
| 4,162,351 | 7/1979 | Putt et al. | 429/101 |

Primary Examiner—Donald L. Walton
Attorney, Agent, or Firm—William R. Hinds

[57] ABSTRACT

The invention relates to an electro-chemical cell having an electrolyte comprising water, a halogen other than fluorine, a halide other than fluoride, which is not oxidized by the halogen as a soluble salt, and a stable, saturated, organic nitrile or dinitrile containing from 2 to 5 carbon atoms or a mixture thereof, said electrolyte being composed such as to exist in two phases, a first phase being halogen and nitrile-rich and a second phase being water-rich and containing halide salt, the cell having an inert electrode in the halogen and nitrile-rich phase and an electrode, containing or contacting halogen oxidizable material, in the water-rich phase. The electro-chemical cell of the invention is particularly applicable to systems containing zinc as the halogen oxidizable material.

The use of the nitrile-rich phase reduces the degree of reaction between the halogen and the halogen oxidizable material.

17 Claims, No Drawings

ELECTRO-CHEMICAL CELLS

The present invention relates to electro-chemical cells in which, in the discharge cycle, a halogen or polyhalide is reduced at an inert cathode and an oxidisable material is oxidised at an anode. In the charge cycle, if used, the redox processes are reversed. In particular, the invention relates to zinc-halogen cells where the oxidisable material is zinc. In this description, the term halogen refers to iodine, bromine, chlorine or iodine monochloride and excludes fluorine. Likewise halide ion excludes fluoride.

In principle, zinc-halogen cells offer low costs, high current densities and high voltage, but historically such cells suffer seriously from self discharge because halogens usually reach the zinc and react chemically with it. Also, in water the halogens are much less soluble and polyhalide ions are much less stable than in some other solvents so a totally aqueous cell is impractical and the high conductivity of aqueous solutions cannot be utilized.

Many attempts have been made to make zinc-halogen cells to overcome the historical problems but they suffer from high cost or self discharge or high internal resistance or require complex methods of storing and circulating the electrolyte. Thus zinc-bromine cells have been used as a totally aqueous system with NaFion separators. Efficiencies are good but the separators are very costly. Others have used organic solvents such as carbon tetrachloride, 1:2-dichloroethane and chloroform which form two phases with water, dissolve large quantities of halogen but which have the halogen rich phase below the water-rich phase. Moreover, they are poor solvents for electrolytes, so give zinc-halogen cells with high internal resistance. Workers at Exxon Corporation have used very low melting organic cation-polybromide salts, as water-immiscible oils at carbon cathodes. These contain most of the bromine as polybromide and keep it from the zinc electrode in the aqueous phase. Such salts are expensive, however, and are used as emulsions in water, requiring high speed pumps external to the battery. Zinc-chlorine batteries have been developed where chlorine is stored externally as solid chlorine hydrate at low temperatures, but refrigeration systems and external pumps are needed, which is a serious disadvantage.

Almost invariably zinc-halogen cells are used in the bipolar mode and this would seem to be most appropriate for the present invention. Carbon, but not graphite, is a common inert electrode, but inert metal-coated electrodes, dimensionally stable ruthenium compounds and other well known inert electrodes are used in the presence of halogens. We believe that carbon-plastic electrodes will prove to be very applicable to the present invention because they have worked well in related zinc-bromine batteries used by workers at Exxon Corporation.

In view of the historical problems the present invention provides solvents which form a second phase in the presence of water, in which halogens are soluble but stable, in which polyhalide ions are stable, polyhalide salts are soluble and most salts are strong electrolytes so as to give highly conducting solutions. It is necessary that the solvent has an interface with a water-rich electrolyte solution which is highly conducting. It is also desirable to avoid having to pump electrolyte or cool chlorine to form hydrate.

We have found that a zinc-halogen cell can be operated as a type of fuel cell, where particulate zinc is introduced from time to time as a slurry to contact a suitably designed inert anode and bromine is introduced continuously or intermittently as a liquid to contact an inert cathode, with removal of aqueous zinc bromide product from time to time. In such a fuel cell or primary battery, the advantage through gravity of having the particulate zinc lying on a horizontal dish-shaped anode at the bottom of a cell is apparent.

Because of our desire to have zinc in a lower water-rich phase in some circumstances, it is preferable that the solvents have the additional property that they are less dense than water. It has been found that those saturated organic nitriles containing from 2 to 5 carbon atoms which do not react with halogens, fill most of the above requirements and that cyanoethane, in particular, fills all the requirements as a component of the halogen rich phase. They are inert to halogens, water is only slightly soluble in them, they form two phase systems with many aqueous electrolyte solutions and are less dense than water. They can dissolve at least 4 M bromine or 0.5 M chlorine at 1 atmosphere. Cyanoethane has a high dielectric constant (27) and a very low viscosity (0.38 cp), polyhalide ions are stable in it and sodium, potassium, or zinc halides and polyhalides are moderately soluble in both phases, when it is present as a two phase system with water. When such nitriles are equilibrated with water, bromine, sodium or zinc bromide and concentrated sodium chloride, the two phases which form have comparable conductivity and the upper nitrile rich phase is bright red, containing typically 3 M bromine, whereas the lower water rich phase contains <0.15 M bromine. The large distribution coefficient of bromine between nitrile-rich phases and water-rich phases means that in such systems, zinc in the water-rich phases is only attacked very slowly by bromine. As noted below, if certain polymeric porous separators are present, e.g. microporous polypropylene ("Celgard"), the distribution of bromine to the aqueous phase can be kept even lower and mixing or "levelling" of the water-rich and nitrile-rich phases can be prevented, no matter what the configuration of the cell.

Thus the present invention provides an electro-chemical cell having an electrolyte comprising water, a halogen other than fluorine a halide other than fluoride which is not oxidised by the halogen preferably the corresponding halide, as a soluble salt whose cation is not oxidised by halogens, and a stable saturated organic nitrile or dinitrile containing from 2 to 5 carbon atoms or a mixture thereof, said electrolyte being composed such as to exist in two phases, a first phase being halogen and nitrile-rich and a second phase being water-rich and containing halide salt, the cell having an inert electrode in the halogen and nitrile-rich phase and an electrode containing or contacting halogen oxidisable material, in the water-rich phase.

The electro-chemical cell can be multiplied to form a battery and the concept of a two phase electrolyte with halogen in a nitrile-rich phase is applicable to a variety of systems. For example, it is applicable to a copper-bromine cell comprising a copper anode immersed in an aqueous 2 M sodium bromide solution with a second phase above it, containing 2 M bromine in cyanoethane and a carbon cathode. The cell had a microporous separator between the phases and operated at 30 mA cm$^{-2}$ at about 1 volt. The halogen nitrile-carbon cathodic half cell can, in principle, be coupled with aqueous anodes familiar to electro-chemists such as metals (zinc, magnesium, cadmium, lead) or oxidisable semi-conductors ($Cu_2S$, $CuFeS_2$, $FeS$) in the appropriate aqueous phases, but zinc seems to offer the best prospects for a useful battery. The two phases are either kept separate naturally, i.e. with the more dense phase (usually water-rich) below the less dense phase (usually nitrile-rich) or they are kept separate in any cell configuration by a polymeric porous separator which is not permeable to the hydrophilic and hydrophobic solvents as described below.

While the discovery of a halogen-nitrile-inert-cathode half cell is of general applicability for batteries when linked with a variety of anodic half cells containing water-rich electrolytes, it will be described hereinafter with particular reference to zinc-halogen cells.

Preferred nitriles for use in the present invention are cyanoethane, 1-cyanopropane and 2-cyanopropane. Cyanomethane is preferred in certain situations where significant water miscibility is not a problem, but cyanomethane is more miscible with water and requires high "salting out" salt concentrations (e.g. 3 M NaCl) and low or moderate temperatures to ensure two phases. A highly conducting nitrile phase is possible with cyanomethane. Acrylonitrile reacts with bromine.

The zinc-bromine battery is preferred over zinc-iodine or zinc-chlorine because iodine is more expensive than bromine and chlorine is a gas, which is less soluble in the nitrile-rich phase and more difficult to contain than bromine. However, chlorine is cheaper than bromine and it is found that it offers higher voltages (2.2 V) in a zinc-halogen cell. All three zinc-halogen batteries have been operated by us using nitrile-rich phases to contain the halogens.

For the zinc-bromine battery, sufficient ions should be present (e.g. 0.5 M) to complex with some bromine and form polybromide salts (e.g. $NaBr_3$) which are soluble and conducting in the nitrile-rich phase. Sodium chloride is the preferred major electrolyte for the aqueous phase because of its low cost, good conductance, salting out characteristics and high solubility in water. About 2 M solutions of NaCl are preferred, but higher concentrations may be used. KCl is preferred without bromide salts, for a zinc-chlorine battery. KCl forms polychlorides in the nitrile rich phase and enhances the solubility of chlorine. Preferably, the electrolyte contains sufficient halide ion such that more than 50% of the halogen in the nitrile rich phase is in the form of polyhalide ions. Carbon is preferred as the inert electrode and carbon in plastic is very suitable for related batteries.

If the battery is to operate in non horizontal configurations, or with a more dense phase on top of a less dense phase, a separator is essential. Microporous polypropylene is preferred as separator material, but a variety of polymeric separators prevent the hydrophobic nitrile-rich and hydrophilic water-rich phases from mixing. Inclusion of such a separator has little effect on the cell current voltage performance. Examples of separators include "Celgard" products, e.g. "Celgard" 5510. Non-woven polymeric fabrics produced by the Kendall Company of Boston, Mass., U.S.A., such as their "Webril" M and T series and "Webline" F series. The "Daramic" separators, used by Exxon Corporation in their zinc-bromine cells, are very effective. It appears that the hydrophobic and hydrophilic properties of separators are important and phase separation is most effective when hydrophilic and hydrophobic phases are on opposite sides of the porous separator. Thus it is found that water flows through "wettable" polypropylene separators to air, or water at a lower level. Polypropylene materials are useful for cell construction. Electrode separations of 0.5 to 1 cm are commonly used in our experiments.

The zinc electrode is preferably zinc in contact with an inert conductor, such as carbon, but zinc plates can be used in primary battery use and as noted, we find that even stationary slurries of zinc powders in aqueous brine solutions in contact with carbon anodes give very effective cells, when coupled with halogen-nitrile-carbon cathodic half cells, containing halide salts, with or without a separator.

As noted, numerous cell configurations are possible with the aid of a separator. If the cell is to be recharged, we find that there are advantages in circulating the zinc halide water-rich phase during charging to improve electrodeposition of zinc. Some hydrogen is formed on charging, so that a vertical arrangement of electrodes and separator is preferred if the cells is to be recharged. The bipolar mode is preferred since it allows easier collection of current from electrodes. If used as a fuel cell or primary battery then the horizontal mode, with a zinc slurry in an electrolyte formulated so that the water-rich phase is the denser and zinc is at the bottom of the cell, is preferred. Some provision for introduction of zinc slurry, drainage of a zinc bromide water-rich solution and replenishment of bromine in the nitrile-rich phase is desirable in the fuel cell mode.

In one method of preparing the electrolyte, cyanoethane and water are equilibrated with sufficient bromine in the cyanoethane to form a 3–4 molar bromine solution in the nitrile-rich phase and with 2 M NaBr and 1 M zinc bromide in the water-rich phase. The nitrile-rich phase (containing dissolved water and zinc and sodium polybromides) is separated from the water-rich phase and placed in the cathode compartment of a zinc bromine cell, equipped with a "Webril" T polypropylene or "Daramic" porous polymeric separator. At the same time, the anode compartment is filled with a 3 M sodium chloride solution in water. The cathode compartment contains a carbon electrode, the anode compartment a zinc-on-carbon electrode. The cell has an open circuit voltage of 1.8 V and is then discharged at >80% Faradaic efficiency at currents between 30–120 mA $cm^{-2}$ at 1.4–0.9 volts. In this method very little bromine appears to pass through the separator from the nitrile-rich to the water-rich phase. In another mode, halogen and solid sodium and zinc-halide are dissolved in the dry nitrile to give polyhalide salts and the nitrile solution is then placed in the cathodic compartment of a cell equipped with separator. The anodic half cell contains zinc and sodium halide in water. Similar procedures were used with iodine replacing bromine and zinc and sodium iodides replacing zinc and sodium bromides, to give a zinc-iodine cell. We constructed a zinc-chlorine cell, with the chlorine maintained at a slight positive pressure. Potassium and zinc chloride replaced bromide salts in the above procedure. A saturated (0.5–1 M) chlorine solution formed in the nitrile-rich phase.

It should be noted that iodide cannot be used in the presence of chlorine or bromine since it would be oxidised to iodine. Similarly, bromide cannot be used in the presence of chlorine since it would be oxidised to bromine.

The main requirement of the electrolyte preparation is that stable nitriles be chosen and concentrations of halogen and halide salts be such that two phases are formed, with both phases highly conducting (e.g. 0.04S cm$^{-1}$) and the nitrile-rich phase containing sufficient halogen and polyhalide to prevent severe concentration polarization at the desired current densities. This is readily achieved by persons skilled in the art, if the principles outlined herein are followed.

Table 1 summarizes results from the simplest form of zinc bromine battery, with no separator and the cyanoethane rich phase above the water-rich phase. The compositions initially were made up with equal volumes of cyanoethane and water but at equilibration, the volumes of the two phases differ as shown, due to mutual solubility of nitrile in water and vice versa. As required, the concentration of bromine is much greater in the nitrile-rich phase. In other experiments, KCl, NaNO$_3$ and LiBr were used to encourage phase separation and enhance conductivity of the phases. The cells discharged at >100 mA cm$^{-2}$ of zinc with no apparent polarization. If a microporous polypropylene separator was included, there was little observed change in current voltage characteristics. Increased temperature lowers the cell resistance but reduces the phase separation the performance is less satisfactory than when the bromine or polybromide is present as a solution in cyanoethane.

TABLE 1

Phase separation, bromine distribution and conductance of cyanoethane-water mixtures containing electrolytes (MX) at 25°. No separator and the nitrile-rich phase is above the water-rich phase.[d]

| (ZnBr$_2$)$_o$[a] M | (Br$_2$)$_o$[a] M | (MX)[a] M | MX | D$_{Br_2}$[b] | V$_{org}$[c] / V$_{aq}$ | Conductance S cm$^{-1}$ org | aq |
|---|---|---|---|---|---|---|---|
| 1.0 | 1.0 | — | — | 7.2 | 6.0 | 0.038 | 0.065 |
| 1.5 | 1.0 | — | — | — | 1 phase | 0.034 | — |
| 1.0 | 1.0 | 1.0 | LiBr | — | 6.0 | 0.038 | 0.08 |
| 1.0 | 1.0 | 2.0 | LiBr | — | 1 phase | — | — |
| 1.0 | 1.0 | 4.0 | LiBr | — | 1.5 | — | — |
| 1.0 | 1.0 | 1.0 | NaCl | 19.3 | 1.4 | 0.039 | 0.09 |
| 1.0 | 1.0 | 3.0 | NaCl | 44.6 | — | — | — |

[a]Concentration is moles of solute per sum of volumes of both phases, expressed as moles liter$^{-1}$.
[b]Ratio of concentrations of bromine in organic versus aqueous phase, at equilibrium.
[c]Ratio of volumes of organic/aqueous phase, at equilibrium.
[d]With 4 M bromine in these compositions, the nitrile-rich phase becomes more dense and thus the lower phase.

TABLE 2

Comparison of the performance of a zinc/bromine battery in various two phase systems containing 1M ZnBr$_2$, 1 M Br$_2$, 2M NaCl or 1 M NEt$_4$Br,[a] plus 1 M NaCl.

| Performance Characteristic | PN[b]/H$_2$O NaCl | BN[b]/H$_2$O NaCl | C$_2$H$_4$Cl$_2$/H$_2$O NEt$_4$Br | CHCl$_3$/H$_2$O[d] NEt$_4$Br | CH$_3$CN NaCl[f] |
|---|---|---|---|---|---|
| 1. Open circuit voltage | 1.74[e] | 1.74 | 1.72 | 1.68 | 1.76 |
| 2. Conductance (S cm$^{-1}$) | | | | | |
| i. organic | 0.044[e] | 0.029 | 0.013 | 0.011 | — |
| ii. aqueous | 0.11[e] | 0.14 | 0.097 | 0.089 | — |
| 3. Cell Resistance (ohm) | 1.0 | 1.1 | 2.7 | 3.0 | 2.0 |
| 4. Discharge current (mA cm$^{-2c}$) | | | | | |
| i. short circuit | 81 (0.83)[c] | 83 (0.79)[c] | 40 (0.6)[c] | 34 (0.45)[c] | 130 (0.24) |
| ii. through 1 ohm | 55 (1.09) | 56 (1.06) | 39 (0.6) | 28 (0.63) | 90 (0.77) |
| iii. through 10 ohm | 14 (1.54) | 14 (1.55) | 12 (1.36) | 10 (1.17) | 22 (1.41) |
| 5. Charging potentials (volts) | | | | | |
| at 5 mA cm$^{-2}$ | 1.84 | 1.83 | 1.84 | 1.89 | 1.74 |
| at 10 mA cm$^{-2}$ | 1.91 | 1.91 | 1.93 | 2.06 | 1.81 |
| 6. Discharge potential (volts) | | | | | |
| at 5 mA cm$^{-2}$ | 1.66 | 1.65 | 1.52 | 1.38 | 1.60 |
| at 10 mA cm$^{-2}$ | 1.60 | 1.59 | 1.32 | 1.14 | 1.54 |
| 7. Polarization (volts at 10 mA cm$^{-2}$ | 0.31 | 0.32 | 0.61 | 0.92 | 0.27 |
| 8. Distribution (org/aq) | | | | | |
| i. Br$_2$ | 27 | 37 | 190 | 460 | — |
| ii. Zn$^{2+}$ | 0.2 | 0.5 | 0.18 | 0.22 | — |

[a]A zinc electrode of area 10 cm$^2$, insulated at back was placed in the aqueous phase, 1 cm from a carbon felt electrode at 25° C. Only the organic solvent was changed. Phases were approximately equal volume.
[b]PN is cyanoethane, BN is 1-cyanopropane or 2-cyanopropane (results indistinguishable).
[c]Voltage for this current density is in parenthesis.
[d]Three phases were formed, with the water rich phase at the top.
[e]A cell with 1 M KCl in place of 1 M NaCl gave the same characteristics.
[f]3M NaCl, 2M ZnBr$_2$ 1M Br$_2$, electrodes 1.3 cm apart.

characteristics.

Table 2 records some data for typical zinc-bromine batteries, using nitrile solvents, together with results in the same cell, using prior art electrolytes. Cyanoethane is slightly superior to 1-cyanopropane and acetonitrile gives very desirable characteristics, but requires high concentrations of NaCl (3 M) to ensure 2 phases. All the nitriles give superior cells to those containing prior art chloroform or dichloroethane as two phase systems, with the organic phase below the water-rich phase.

Table 3 compares the performance of a cyanoethane based zinc bromine cell with the same cell in which bromine is present as the water immiscible liquid N-methyl-N-methoxymethyl piperidinium polybromide salt. The latter is currently under investigation, as an electrolyte for zinc bromine cells, by other groups, but

TABLE 3

Comparison of the discharge performance of a zinc bromine battery with (NR$_4$+Br$_3$−)[b] or Zn(Br$_3$)$_2$ in CH$_3$CH$_2$CN in the cathode compartment. The battery comprises a porous carbon cathode, zinc anode, "Webril" non-woven polypropylene separator. Electrode separation 1 cm, electrode area, 3 cm$^2$, temperature 25° C.[a]

| | Zn(Br$_3$)$_2$ in CH$_3$CH$_2$CN | NR$_4$Br$_3$ Oil |
|---|---|---|
| Concentration of Br$_2$ | 4–5 M | ca. 9 M |
| Solvents | water/ cyanoethane | oil |
| Supporting electrolyte | 5 M NaBr | 5 M NaBr |
| Open circuit voltage (volts) | 1.819 | 1.783 |
| Short circuit current (m Amps) | 0.491 | 0.524 |

TABLE 3-continued

Comparison of the discharge performance of a zinc bromine battery with $(NR_4^+Br_3^-)^b$ or $Zn(Br_3)_2$ in $CH_3CH_2CN$ in the cathode compartment. The battery comprises a porous carbon cathode, zinc anode, "Webril" non-woven polypropylene separator. Electrode separation 1 cm, electrode area, 3 cm², temperature 25° C.[a]

|  | $Zn(Br_3)_2$ in $CH_3CH_2CN$ | $NR_4Br_3$ Oil |
|---|---|---|
| Short circuit voltage (volts) | 0.404 | 0.260 |
| Short circuit power (m Watts cm⁻²) | 101.2 | 70 |
| Max. power output (m Watts cm⁻²) | 138 (2Ω)[a] | 128 (2Ω)[a] |
| Conductivity of bromine-rich phase (S cm⁻²) | 0.07 | 0.042 |
| Conductivity of water-rich phase (S cm⁻²) | ca 0.1 | ca 0.1 |

[a]Cell operated for 6 hours with the separator in the vertical mode at this power density. It recharged when an external potential of 1.9 volts was applied.
[b]$NR_4^+$ is the N—methyl-N—methoxymethyl piperidinium cation.

The present invention will now be illustrated by the following examples.

EXAMPLE 1

This example illustrates an embodiment of the present invention with both solutions stationary in the horizontal mode. 0.1 mole of bromine and 0.2 mole each of zinc bromide and NaCl was dissolved in a mixture of 100 ml water and 100 ml cyanoethane. Two layers of approximately equal volume appeared. The upper layer was red, the lower pale yellow. A porous carbon felt electrode, larger than the zinc electrode, and partly in the organic phase and partly in the aqueous phase, and a zinc electrode separated by 1 cm were placed in the upper red and lower yellow solutions respectively and connected to current and voltage measuring devices. Both solutions were still and at 22° C. The cell had an open circuit voltage of 1.76 V and a short circuit current of 210 mA cm⁻² of zinc. While charging for 6 hours at 20 mA cm⁻² the voltage was 1.96 V and zinc was plated on the zinc electrode. Some dentrites were formed. A few gas bubbles were evolved, during charging at the zinc electrode. A little loose particulate zinc rested on the zinc electrode after 6 hours charging because of the horizontal configuration. The cell was discharged at 20 mA cm⁻² at 1.50 V over 6 hours. The coulombic efficiency over the discharge-charge cycle was 77% (i.e. 90% on charge, 86% on discharge).

EXAMPLE II

In an embodiment similar to that of Example I, the upper nitrile-rich layer flowed slowly past a glassy carbon electrode of the same size as the zinc, but the lower water-rich layer remained still. The voltage on charging at 10 mA cm⁻² of zinc was 2.00 V and on discharging at 20 mA cm⁻² was 1.55 V.

EXAMPLE III

A zinc chlorine cell was discharged in which the electrolyte was saturated chlorine under a slight positive pressure, 1 M KCl and 1 M zinc chloride in equal volumes of water and cyanoethane. Electrodes were zinc in the lower phase and carbon in the upper and there was no separator. The open circuit voltage was 2.2 volt and the short circuit current was 200 mA cm⁻² of zinc. In a separate experiment, the distribution coefficient for chlorine between cyanoethane and water containing 2 M NaCl, 1 M $ZnCl_2$ and saturated chlorine at 1 atmosphere was found to be 50. The concentration of chlorine in the organic phase was 0.5 M.

EXAMPLE IV

A zinc-halogen battery was operated in which the electrolyte was 1 M iodine monochloride, 4 M NaCl, 4 M $NH_4Cl$ and 1 M zinc chloride in equal volumes of water and cyanoethane. Electrodes were zinc and carbon at 0.75 cm separation. The open circuit voltage was 1.78 volt and the short circuit current on discharge was ca 230 mA cm⁻² of zinc at 0.77 volt, rising to 250 mA cm⁻² at 0.88 volt after 5 minutes.

EXAMPLE V

A zinc-iodine cell was operated in a similar fashion to the $Zn/Br_2$ battery with solutions containing cyanoethane, water, 0.5 M iodine, 1.0 M zinc iodide and saturated potassium iodide. The electrodes were zinc and platinum. The open circuit voltage was 1.13 volt and the battery delivered 48 mA cm⁻² at 0.3 volt when short circuited. Coulombic charging efficiency was 71% at 25 mA cm⁻² at a voltage of 1.64 V.

EXAMPLE VI

A battery was operated in which the two phase electrolyte was equilibrated 1 M bromine, 1 M zinc bromide, and 1 M NaCl in equal volumes of water and cyanoethane. A carbon felt electrode of geometrical area 10 cm² was in the upper bromine and nitrile-rich layer and the other electrode was platinum gauze of about 15 cm² effective area in a gently stirred suspension of zinc powder in the lower water-rich phase. The open circuit voltage was 1.70 V, the short circuit current was 1050 mA and when discharged at 356 mA the voltage was 1.16 volt. A stationary layer of zinc powder in the lower water-rich phase resting on a 10 cm² dense carbon anode, with a "Daramic" separator between the two phases gave a comparable result.

EXAMPLE VII

The zinc-bromine batteries described in Example I, II and VI were operated in various configurations with a non-woven "Webril" polypropylene separator of thickness 0.005 inches, between the carbon electrode and the aqueous phase. The performance was little changed at current densities of 20 mA cm⁻² from cells without separator. A "CELGARD" 511 micro porous wettable film polypropylene from Celanese Plactics Company behaved similarly to the Webril separator, as did a "Daramic" separator supplied by Exxon Corporation.

In separate experiments it was established that cyanoethane containing bromine and zinc tribromide did not pass through the "Webril" separator or "Celgard" 511 separators into an aqueous solution.

EXAMPLE VIII

Zinc-bromine cells containing 4–5 M bromine, 3 M NaCl and 0.5 M $ZnBr_2$ in equal volumes of water and cyanoethane were operated in the discharge mode with two 1 dm² Celgard 511 microporous separators with a 10 cm×10 cm×2 mm dense carbon cathode in the nitrile-rich phase, and two 10 cm×10 cm×2 mm zinc anodes in the water-rich phases on either side of the carbon. Separator and electrodes were in the vertical mode. Power densities of 50 mW cm⁻² were obtained at 1.0–1.2 volt and >80% efficiency. Short term charging for intermittent periods at 20 mA cm⁻² at 2.1 volt proceeded satisfactorily with formation of zinc and bromine.

EXAMPLE IX

A three electrode system based on Example VIII, operating in the bipolar horizontal mode with carbon cathode and zinc powder on carbon anode had an open circuit voltage of 3.5 V and a maximum power density of 40 mW cm$^{-2}$. The carbon was somewhat porous which detracted from the long term performance of this bipolar battery.

EXAMPLE X

The types of cells described in Examples VI and VII above were operated with little change in performance, by continuously dripping bromine into the cyanoethane rich phase containing a carbon cathode. Zinc powder half filled the anodic compartment which contained aqueous 2 M NaCl and zinc bromide solution. The zinc powder contacted a carbon felt or a high conductivity compact carbon anode and was renewed intermittently as a zinc slurry in 2 M NaCl. Zinc bromide solution was drained off from time to time in an amount equivalent to the 2 M brine slurry. Modifications and variations such as would be apparent to a skilled addressee are deemed within the scope of the present invention.

We claim:

1. An electro-chemical cell having an electrolyte comprising water, a halogen other than fluorine, a halide other than fluoride which is not oxidised by the halogen as a soluble salt, and a stable, saturated, organic nitrile or dinitrile containing from 2 to 5 carbon atoms or a mixture thereof, said electrolyte being composed such as to exist in two phases, a first phase being halogen and nitrile-rich and a second phase being water-rich and containing halide salt, the cell having an inert electrode in the halogen and nitrile-rich phase and an electrode, containing or contacting halogen oxidisable material, in the water-rich phase.

2. An electro-chemical cell according to claim 1, in which the electrolyte contains the halide corresponding to the halogen.

3. An electro-chemical cell according to claim 1, in which the organic nitrile is cyanoethane, 1-cyanopropane, 2-cyanopropane or acetonitrile.

4. An electro-chemical cell according to claim 1, in which the nitrile-rich phase in the cell is replenishable with halogen by adding halogen to said phase during or after discharge.

5. An electro-chemical cell according to claim 1, which is a zinc-halogen cell in which the electrode in the water-rich phase contains or contacts zinc as the oxidisable material.

6. An electro-chemical cell according to claim 5, in which the electrode in the water-rich phase contains particulate zinc in contact with an inert anode.

7. An electro-chemical cell according to claim 5, in which particulate zinc in an anode compartment is replenishable by adding particulate zinc during or after discharge.

8. An electro-chemical cell according to claim 5, in which a solution of zinc halide salt in the water-rich phase has been removed and replaced by a solution of a halide salt containing less zinc halide in a water-rich phase.

9. An electro-chemical cell according to claim 5, which is a zinc-bromine cell containing bromine as the halogen in the electrolyte and bromide ions as the halide.

10. An electro-chemical cell according to claim 1, in which the electrolyte contains an amount of a stable salting out salt to enhance the separation of the electrolyte into two phases and enhance the conductance of the phases.

11. An electro-chemical cell according to claim 10, in which the salting out salt is a chloride taken from the group consisting of sodium chloride and potassium chloride.

12. An electro-chemical cell according to claim 1, in which the electrolyte contains sufficient halide such that more than 50% of the halogen in the nitrile-rich phase is in the form of polyhalide ions.

13. An electro-chemical cell according to claim 1, in which the two phases are separated by an inert porous polymeric separator which is substantially impermeable in the cell to water-rich phases and phases rich in saturated organic nitriles and dinitriles containing from 2 to 5 carbon atoms, but is permeable to small ions.

14. An electro-chemical cell according to claim 13, in which the separator is formed from micro-porous polyethylene or polypropylene.

15. An electro-chemical cell according to claim 13, in which the separator is formed from non-water wettable micro-porous polypropylene.

16. An electro-chemical cell according to claim 13, in which the separator is non-horizontally disposed.

17. An electro-chemical cell according to claim 1, in which the nitrile-rich phase is above the water-rich phase.

* * * * *

UNITED STATES PATENT AND TRADEMARK OFFICE
CERTIFICATE OF CORRECTION

PATENT NO. : 4,377,623
DATED : March 22, 1983
INVENTOR(S) : Alan J. Parker; Pritam Singh; James Avraamides It is certified that error appears in the above-identified patent and that said Letters Patent are hereby corrected as shown below:

In the heading of the patent, under item [30] Foreign Application Priority Data, the second and third lines are changed to read:

Aug. 6, 1980 [AU] Australia ...........PE4900

Mar. 11, 1981 [AU] Australia ...........PE7949

Signed and Sealed this

Thirty-first Day of May 1983

[SEAL]

Attest:

DONALD J. QUIGG

Attesting Officer

Acting Commissioner of Patents and Trademarks